US009674112B2

(12) United States Patent
Hamdi et al.

(10) Patent No.: US 9,674,112 B2
(45) Date of Patent: *Jun. 6, 2017

(54) APPLICATION AWARE NETWORK VIRTUALIZATION

(71) Applicant: Dell Products L.P., Round Rock, TX (US)

(72) Inventors: Rabah S. Hamdi, Spring, TX (US); Saikrishna M. Kotha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/076,056

(22) Filed: Mar. 21, 2016

(65) Prior Publication Data

US 2016/0205038 A1    Jul. 14, 2016

Related U.S. Application Data

(63) Continuation of application No. 13/670,920, filed on Nov. 7, 2012, now Pat. No. 9,294,411.

(51) Int. Cl.

| | |
|---|---|
| *G06F 15/177* | (2006.01) |
| *H04L 12/911* | (2013.01) |
| *H04L 12/851* | (2013.01) |
| *H04L 12/931* | (2013.01) |
| *H04L 29/08* | (2006.01) |
| *H04L 12/773* | (2013.01) |
| *H04L 12/725* | (2013.01) |

(52) U.S. Cl.
CPC ............ *H04L 47/82* (2013.01); *H04L 45/306* (2013.01); *H04L 45/60* (2013.01); *H04L 47/2441* (2013.01); *H04L 49/355* (2013.01); *H04L 49/70* (2013.01); *H04L 67/10* (2013.01); *H04L 69/329* (2013.01)

(58) Field of Classification Search
CPC . H04L 12/5696; H04L 45/306; H04L 49/355; H04L 49/70
See application file for complete search history.

(56) References Cited

U.S. PATENT DOCUMENTS

| | | |
|---|---|---|
| 6,973,085 B1 | 12/2005 | Acharya |
| 8,639,783 B1 | 1/2014 | Bakke et al. |
| 2008/0165777 A1 | 7/2008 | Gainey et al. |

(Continued)

*Primary Examiner* — Brendan Higa
(74) *Attorney, Agent, or Firm* — Haynes and Boone, LLP

(57) ABSTRACT

A networked system includes a plurality of information handling systems (IHSs). A networking device couples the plurality of IHSs to a network. The networking device is operable to receive a packet associated with a first network application from a first IHS of the plurality of IHSs. The networking device then determines that a first virtual port is associated with the first network application in a database. The networking device then assign packets received from the first IHS and associated with the first network application to the first virtual port. The networking device then forwards packets received from the first IHS and associated with the first network application over the network using the first virtual port. The first virtual port provides access to a virtual network that is provided for the first network application and configured using network information associated with the first network application.

20 Claims, 5 Drawing Sheets

(56) References Cited

U.S. PATENT DOCUMENTS

| | | | |
|---|---|---|---|
| 2010/0054260 A1* | 3/2010 | Pandey | H04L 49/00 370/395.53 |
| 2011/0153715 A1 | 6/2011 | Oshins et al. | |
| 2012/0210421 A1 | 8/2012 | Ormazabal et al. | |
| 2013/0223442 A1 | 8/2013 | Narayanan et al. | |
| 2013/0268588 A1 | 10/2013 | Chang et al. | |
| 2013/0326087 A1 | 12/2013 | Storz et al. | |
| 2014/0129714 A1 | 5/2014 | Hamdi et al. | |
| 2014/0201846 A1 | 7/2014 | Anantharam et al. | |

* cited by examiner

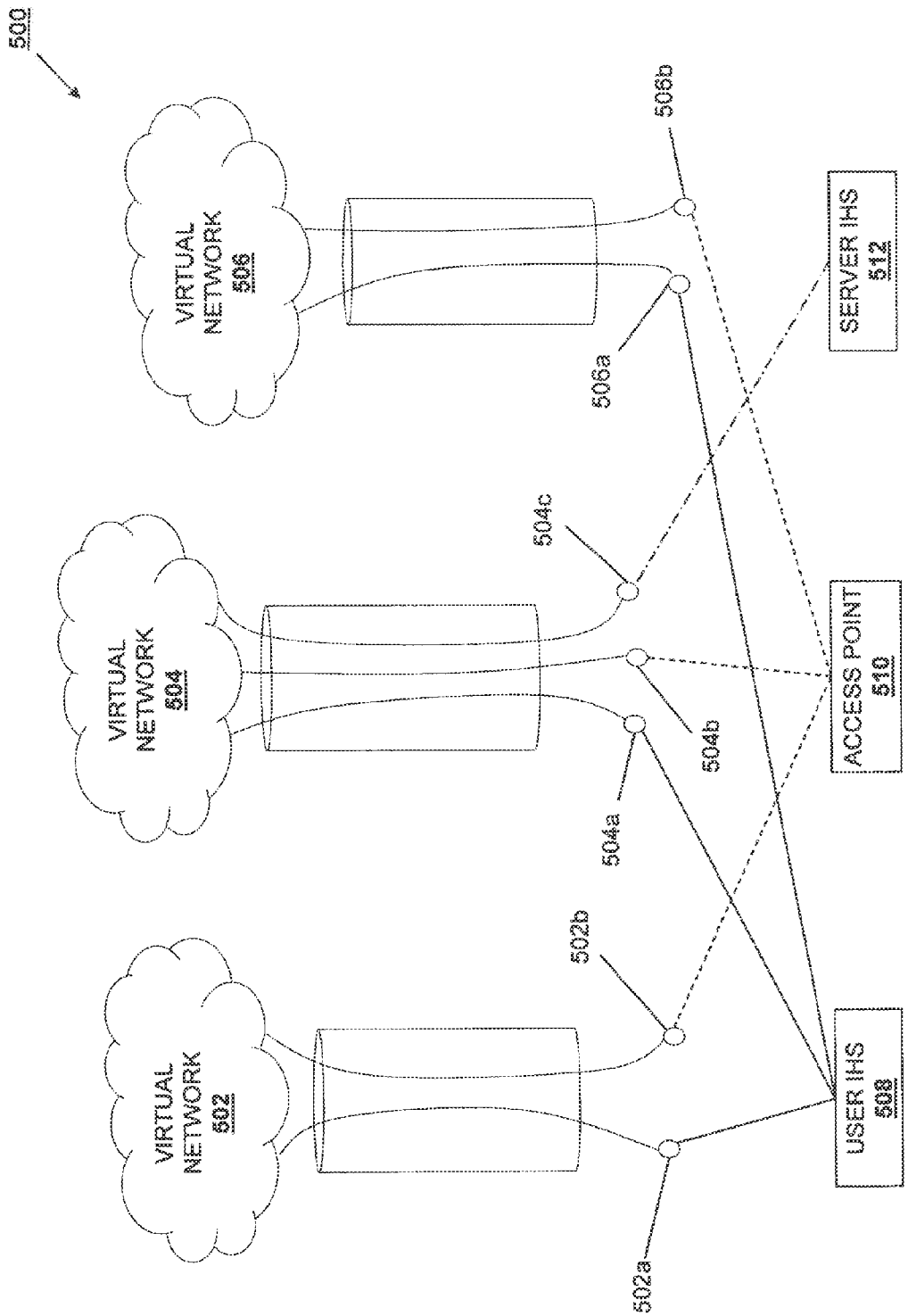

APPLICATION AWARE NETWORK VIRTUALIZATION

CROSS-REFERENCE TO RELATED APPLICATIONS

This is a Continuation application to U.S. Utility Application Ser. No. 13/670,920 filed Nov. 7, 2012, entitled "APPLICATION AWARE NETWORK VIRTUALIZATION," the disclosure of which is incorporated herein by reference in their entirety.

BACKGROUND

The present disclosure relates generally to information handling systems, and more particularly to application aware network virtualization for networked information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs are typically networked together to allow communication between the IHSs. The configuration and management of these IHS networks are tedious and cumbersome to administrators and users, while the manual and static provisioning of these IHS networks makes it highly undesirable and extremely difficult to perform technology evaluations while maintaining network applications and services such as, for example, content and application aware processing and scaling network properties. Furthermore, when these IHS networks are provisioned for highly mobile users, consistent network applications and services may not be maintained when the users roam across different network segments or from one network to another.

Application aware networks have been provided to solve some of these problems, but conventional application aware networks are associated with design complexities and deficiencies that are embedded in access networks within enterprise Local Area Network (LAN) and wireless LAN infrastructureS, and create problems with regard to application based network segmentation, virtualization, and management.

Accordingly, it would be desirable to provide an improved application aware based networking system.

SUMMARY

According to one embodiment, a networking device includes a memory storing associations between a plurality of network applications and a plurality of virtual ports, wherein each of the plurality of network applications is associated with a subset of the plurality of virtual ports; and a processor coupled to the memory, wherein the processor is operable to: receive a packet from a first network application of the plurality of network applications; determine a first subset of the plurality of virtual ports that is associated with the first network application in the memory; and assign packets received from the first network application to a first virtual port in the first subset of the plurality of virtual ports.

BRIEF DESCRIPTION OF THE DRAWINGS

FIG. 5 is a schematic view illustrating an embodiment of network traffic flow according to the networked system of FIG. 2 and the method of FIG. 4.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
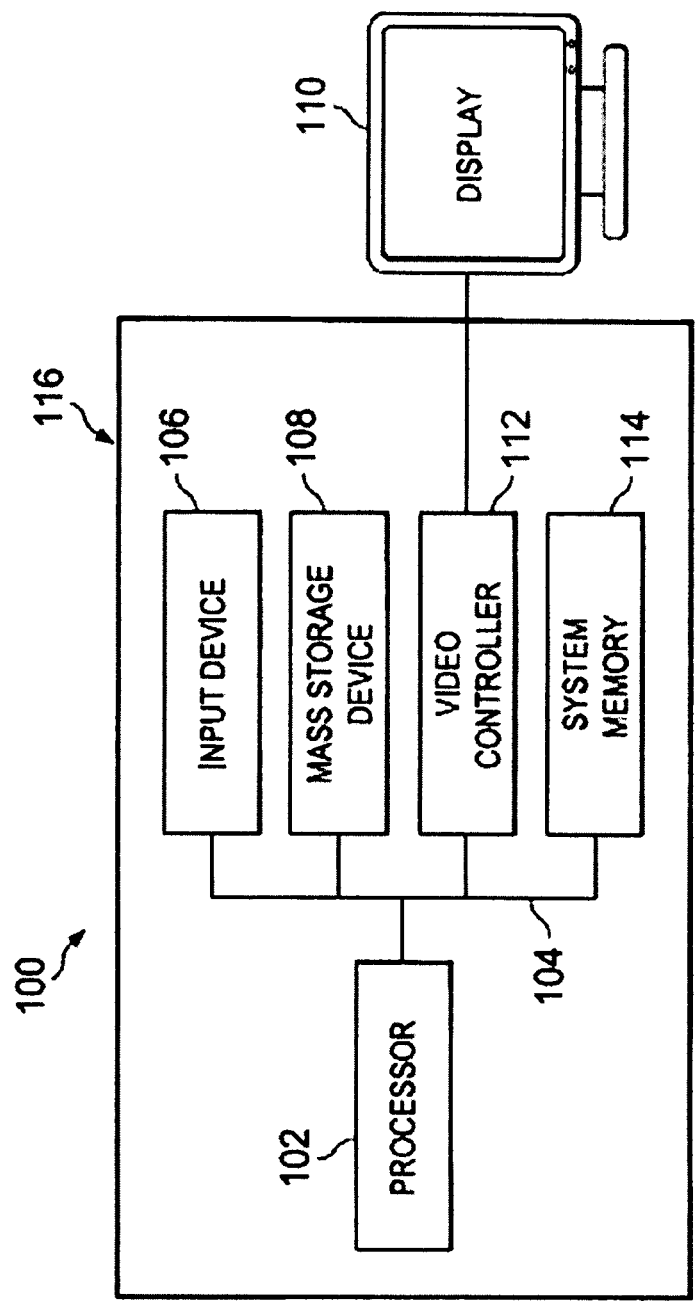
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
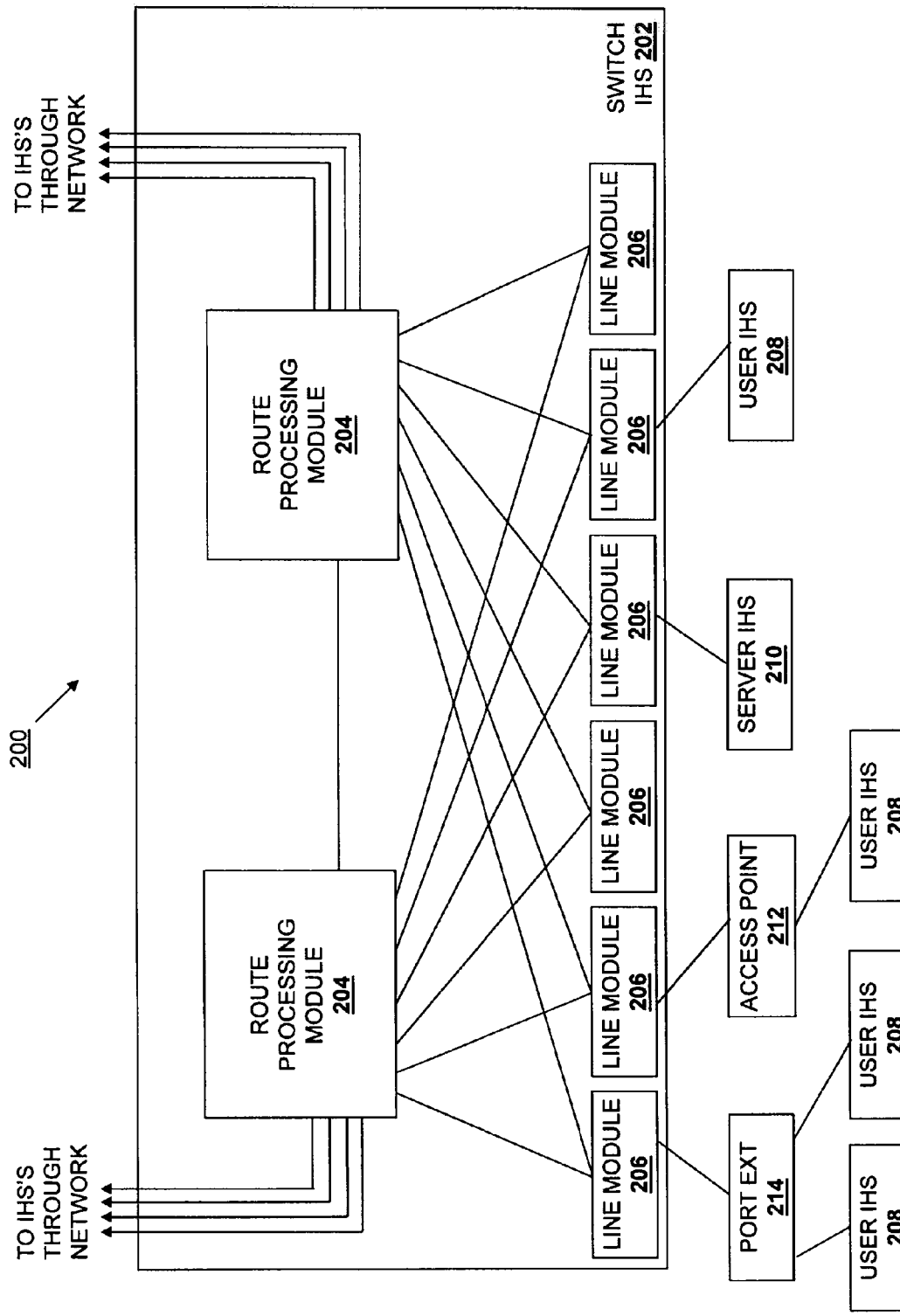
FIG. 2 is a schematic view illustrating an embodiment of a networked system.

Referring now to FIG. 2, an embodiment of an networked system 200 is illustrated. The embodiment of the networked system 200 illustrated in FIG. 2 is an example of an application aware virtual network system that includes an optimized switch fabric port extender that may be tailored for a application aware virtual network. However, the example illustrated in FIG. 2 is simply one example of an networked system that provides an application aware virtual network system according to the teachings of the present disclosure, and one of skill in the art will recognize that the teachings below may be applied to a variety of different devices and systems without departing from the scope of the present disclosure. The networked system 200 includes a switch IHS 202 having a plurality of route processing modules 204 each connected to a plurality of line modules 206. As illustrated, any of the line modules 206 may be connected to user IHSs 208 or server IHSs 210 directly, through an access point 212, and/or through a port extender 214. As would be understood by one of skill in the art, the switch IHS 202 may be connected to a core switch or router (not illustrated) that is further connected the Internet, a datacenter, etc.

Figure 3:
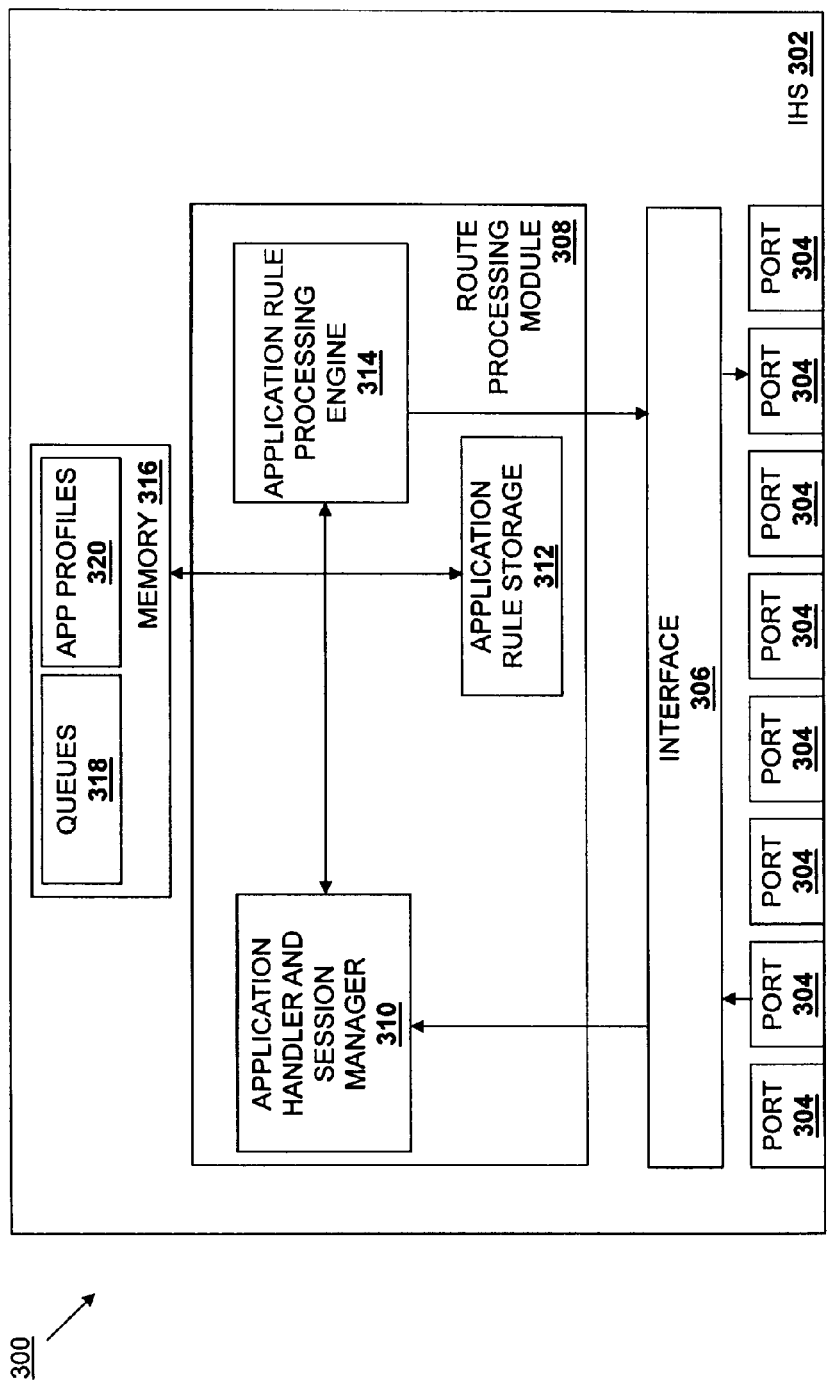
FIG. 3 is a schematic view illustrating an embodiment of a networking device.

Referring now to FIG. 3, an embodiment of an application aware virtual networking device 300 is illustrated. The application aware virtual networking device 300 includes an IHS 302. In an embodiment, the IHS 302 may be the IHS 100, described above with reference to FIG. 1, may be included in the route processing modules 204, the line modules 206, the access point 212, or the port extender 214, described above with reference to FIG. 2, and/or may be provided in a variety of other network components known in the art. The IHS 302 includes a plurality of ports 304 that are each coupled to an interface 306 that may include, for example, a Media Interface with physical (PHY) and link (MAC) layers. The interface 306 couples the ports 304 to a route processing module 308 which, in an embodiment, may be an application aware virtual network processing chip such as, for example, a chip that has been optimized to inspect and classify application layer packet information (as opposed to convention packet processing chips that process packets based on layer-2 and layer-3 data). The route processing module 308 includes an application handler and session manager 310, an application rule processing engine 314, and an application rule storage 312. Each of the application handler and session manager 310 and the application rule processing engine 314 are coupled to the interface 306. The application handler and session manager 310, the application rule processing engine 314, and the application rule storage 312 are coupled to each other and to a memory 316 that includes queues 318 and application profiles 320. The application profiles 320 is configurable and programmable by a network administrator to include a variety of application profiles, discussed in further detail below. Furthermore, the application profiles 320 may include one or more default profiles that may be applied to application packets that are not associated with any administrator defined application profiles, discussed in further detail below. In an embodiment, the memory 316 is external to the packet processor 308 and coupled to at least one core of the route processing module 308 through a high speed memory bus. While not illustrated in detail, one of skill in the art will recognize that the IHS 302 may include one or more non-transitory, computer-readable mediums that are coupled to the route processing module 308 and include instructions that, when executed by the route processing module 308, cause the route processing module 308 to provide the functions of the application handler and session manager 310 and the application rule processing engine 314, discussed in further detail below.

As discussed in further detail below, the route processing module 308 is operable to perform application packet metadata search, inspection, collection, and processing by retrieving metadata from the application packet header pertaining to application profile information (e.g., signatures, data types, application policies, forwarding, modification rules, and/or a variety of other application profile information known in the art.) Furthermore, application profiles to be determined from application packets are programmable by a network administrator and configurable based on application characteristics.

Figure 4:
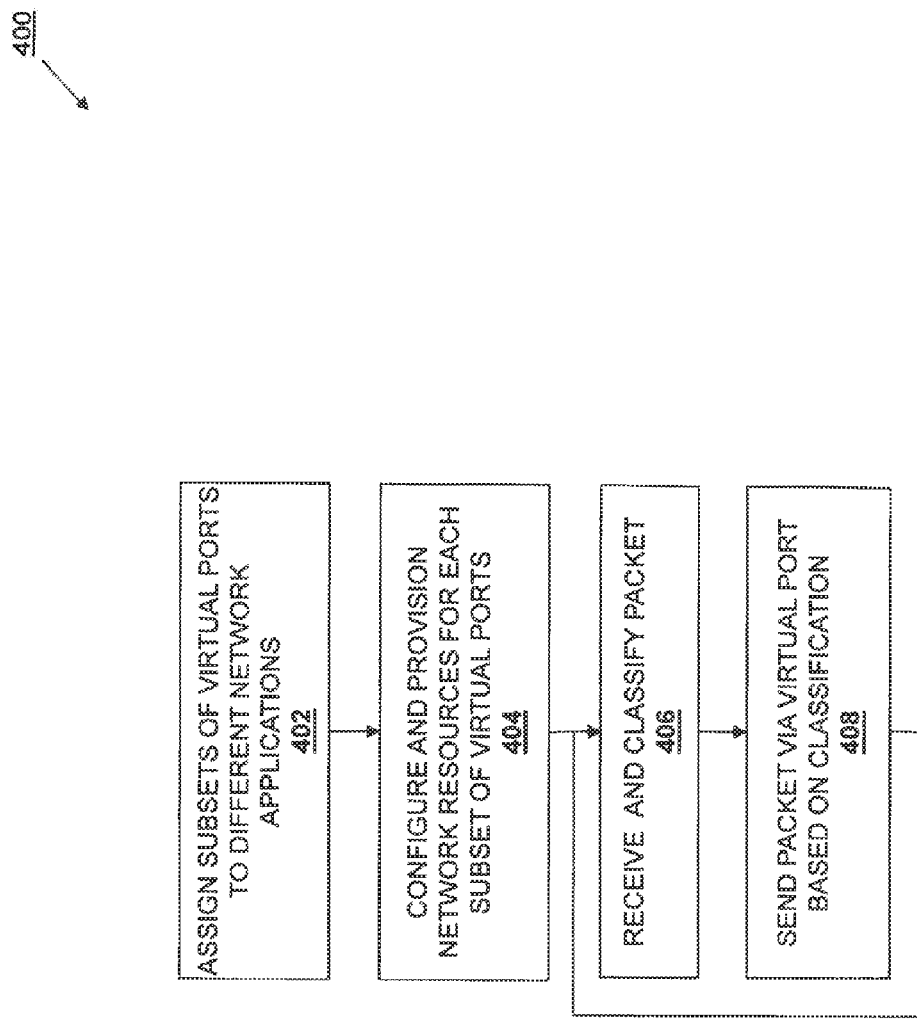
FIG. 4 is a flow chart illustrating an embodiment of a method for networking IHSs.

Referring now to FIGS. 3, 4, and 5, an embodiment of a method 400 for application aware virtual networking is illustrated. The method 400 may be performed by the application aware virtual networking device 300 as illustrated in FIG. 3, as implemented in the networked system 200 of FIG. 2 (e.g., in the route processing modules 204, line modules 206, access points 208, and/or port extenders 208) and/or in a variety of other networking scenarios known in the art. The method 400 and application aware networking architecture illustrated in FIG. 3 may be leveraged for access network designs, aggregation network designs, and a variety of other network designs known in the art. The application aware processing performed in the method 400 addresses next-generation network architecture that requires intensive and high performance packet processing of content aware applications and services at line rate speeds, while providing programmable deep packet inspection and classification of complex data types of application services designed into emerging technologies (e.g., the OpenFlow protocol, L4-L7 protocols, security and filtering, traffic management, load balancing, rate shaping, and/or a variety of other emerging technologies known in the art.)

The method 400 begins at block 402 where subsets of virtual ports are assigned to different network applications. As discussed in further detail below, the system and method of the present disclosure provides an application aware virtual networking system by associating subsets of virtual ports with application-based network services, thus allowing network clients running applications to have packets from those applications forwarded via the virtual ports over one or more virtual networks designated to provide application based services for those applications. Simple configurations administered by a network administrator provisions the components necessary for creating the application aware virtualization aspects of the networked system, and such configuration may be driven by the profiles of the applications. Network clients running the applications may require no configuration because all applications running on those network will be classified and associated with the appropriate virtual ports (and thus forwarded over a virtual network designated for the application) by the system.

At block 402, a plurality of virtual networks 502, 504, and 506 may be defined for particular applications or application profiles by designating virtual ports for those applications or application profiles. For example, devices (e.g., the user IHSs 208, the server IHS 210, the access point 212, the port extender 214, etc.), client applications, and physical user ports (e.g., ports provided on the line modules 206, the ports 304, etc.) may each be designated or associated with a virtual port, and subsets of those virtual ports may be associated with a particular application profile to define a virtual network for application packets having that application profile. In an embodiment, the virtual network 502 may be defined for a first application type such as, for example, Microsoft® Lync applications that provide instant messaging clients in enterprise environments. In an embodiment, the virtual network 504 may be defined for a second application type such as, for example, video conferencing applications. In an embodiment, the virtual network 506 may be defined for a third application type such as, for example, Voice over Internet Protocol (VoIP) applications that provide voice communication and multimedia sessions over IP networks. Each network application (e.g., Lync applications, Video conferencing applications, and VoIP applications) may include an application profile associated with a subset of the virtual ports such that packets from that application will be forwarded over a corresponding virtual network via one of those virtual ports, discussed below. One of skill in the art will recognize that any number of virtual networks may be defined for the applications and/or services provided in the network system.

The virtual ports and their associated application(s) or application profile(s) that define the virtual networks 502, 504, and 506 may then be assigned appropriate values of network resources and properties. In an embodiment, the virtual network 502 may be defined by a subset of virtual ports 100-299 and an application profile, the virtual network 504 may be defined by a subset of virtual ports 300-599 and an application profile, and the virtual network 506 may be defined by a subset of virtual ports 700-999 and an application profile. As discussed above, while there are no requirements for configuration of client devices (e.g., the user IHS 508, the access point 510, and the server IHS 512 in FIG. 5), there may be minimal configuration required to define the virtual networks 502, 504, and 506 using the virtual ports and application profiles. For example, a network administrator may assign the subsets of virtual ports to each application of interest (e.g., virtual ports 100-299 are assigned to Lync applications, virtual ports 300-599 are assigned to video conferencing applications, and virtual ports 700-999 are assigned to VoIP applications in the example discussed above), and the naming of these assignments may create the virtual network name space.

In an embodiment, the assignment of virtual ports to applications includes the storing of application profiles in the application profiles 320. As discussed in further detail below, the route processing module 308 is operable to receive application packets, classify those application packets based on application profiles in the application profiles 320, and then assign a virtual port to application packets of a particular application or application type based on the classification of the application packets. Thus, the application profiles 320 may include application classification attributes of an application profile such as protocols being used by applications, Universal Resource Locator (URL) addresses for application servers, applications signatures, and/or a variety of other applications attributes known in the art.

The method 400 then proceeds to block 404 where network resources are configured and provisioned for each subset of virtual ports. In an embodiment, the network administrator may configure and provision network resources and properties suited for each application such as, for example, quality of service, priorities, bandwidth allocations, policies, traffic shaping, and/or a variety of other network resources and properties known in the art. In one example, virtual network properties are used to configure the network resources for applications, with configuration profiles stored on a network management system and pushed to the Route Processing Module 308 to configure the network (e.g., switches and other devices in the network.)

The method 400 then proceed to block 406 where packets are received and classified. In an embodiment, the IHS 302 may receive and assemble a packet. As is known in the art, packets may be sent from one or more IHS's in a network to the IHS 302 (e.g., a first IHS may send a first set of packets to the IHS 302 over the network, a second IHS may send a second set of packets to the IHS 302 over the network, and so on.) In an embodiment, packet data ingresses the IHS 302 through one of the ports 304 (e.g., directly from an IHS or through an access point or port extender). That packet data passes through the interface 306 and to the application handler and session manager 310 in the route processing module 308. The application handler and session manager 310 receives the packet data and assembles the packet data into packets for further processing. Thus, the application handler and session manager 310 may receive a first set of packet data and assemble a first packet from that packet data, receive a second set of packet data and assemble a second packet from that packet data, receive a third set of packet data and assemble a third packet from that packet data, and so on. As packets are assembled, they may be stored in the queues 318 of the memory 316 before or while being processed.

Subsequent to assembling a packet, the application handler and session manager 310 may perform a deep inspection on the packet header. For example, the application handler and session manager 310 may inspect the packet header for layer 4 (transport layer) metadata (e.g.,. TCP, UDP, SCTP, DCCP, and/or SPX data), layer 5 (session layer) metadata (e.g., Named pipe, NetBIOS, SAP, PPTP, and/or SOCKS data), layer 6 (presentation layer) metadata (e.g., MIME, XDR, TLS, and/or SSL data), and/or layer 7 (application layer) metadata (e.g., NNTP, SIP SSI, DNS, FTP, Gopher, HTTP, NFS, NTP, SMPP, SMTP, SNMP, Telnet, DHCP, Netconf, RTP, SPDY, and/or other application layer metadata known in the art). In one example, an application may use Session Initiation Protocol (SIP) to communicate with other entities in the network, and at decision block 404, the application handler and session manager 310 will retrieve SIP application layer data from the packet header. Using the metadata from the deep inspection of the packet, the application handler and session manager 310 then compares that metadata to application profiles that are stored in the application profiles 320 to determine whether the packet assembled matches one or more of the application profiles that are stored in the application profiles 320. The application handler and session manager 310 may employ a variety of algorithms to determine whether the metadata from the packet is associated with an application such as, for example, retrieving application layer metadata such as signatures (e.g., URLs) from the packet header and matching that application layer metadata with application profiles for an application in the application table.

Using the metadata retrieved through the deep packet inspection discussed above, the application handler and session manager 310 may access the application profiles 320 to determine whether any application profiles exist for that packet. In one example, a network administrator may have defined an application profile for VoIP applications (e.g., the profile may cause the packet to be redirected to a virtual network provided for VoIP traffic). When a packet is received and the deep packet inspection retrieves application layer metadata that includes a signature related to a VoIP application, the application handler and session manager 310 will determine that signature matches an application profile in the application profiles 320. A network administrator of the application aware network switching system 300 may pre-configure and program application profiles for packets into the application profiles 320 for particular applications, and application profiles associated with those particular application are then stored in the application profiles 320 and used to match packets to subsets of virtual ports associated with those application profiles.

If the application handler and session manager 310 determines an application profile matches the packet metadata, the application handler and session manager 310 classifies the packet as being from a particular application. For example, application profiles may be used to determine that a packet received by the route processing module 308 is from a Lync application, a video conferencing application, or a VoIP application.

The method 400 then proceeds to block 408 where the packet is sent via a virtual port based on the classification in block 406 is the method 400. In response to receiving a packet at block 406 and classifying the packet as received from a particular application, the application rule processing engine 314 associates that packet (and further packets received form that application) with a virtual port in the subset of virtual ports associated with that application. In an embodiment, the application rule processing engine 314 may apply one or more rules from the application rules storage 312 to the packet before associating the packet with a virtual port for forwarding. For example, as illustrated in FIG. 5, operation of the user IHS 508 may provide packets from a Lync application, a video conferencing application, and a VoIP application to the network system, and the packets classified as from a Lync application will be assigned and sent via virtual port 502a of the subset of virtual ports that define the virtual network 502, the packets classified as from a video conferencing application will be assigned and sent via the virtual port 504a of the subset of virtual ports that define the virtual network 504, and the packets classified as from a VoIP application will be assigned and sent via the virtual port 506a of the subset of virtual ports that define the virtual network 506. Similarly, operation of the access point 510 may provide packets from a Lync application, a video conferencing application, and a VoIP application to the network system, and the packets classified as from a Lync application will be assigned and sent via a virtual port 502b of the subset of virtual ports that define the virtual network 502, the packets classified as from a video conferencing application will be assigned and sent via a virtual port 504b of the subset of virtual ports that define the virtual network 504, and the packets classified as from a VoIP application will be assigned and sent via a virtual port 506b of the subset of virtual ports that define the virtual network 506. Similarly, operation of the server IHS 512 may provide packets from a video conferencing application to the network system, and those packets will be classified as from a video conferencing application and will be assigned and sent via a virtual port 504c of the subset of virtual ports that define the virtual network 504.

The method 400 then returns to blocks 406 and 408 where packets are received and classified and sent to virtual ports as discussed above. One of skill in the art will recognize that the method 400 may be used by the application aware network switching system to process, in parallel, sets of packets associated with different applications. For example, a first set of packets associated with a first application may be received and classified, followed by the forwarding of those first set of packets through the network via the appropriate virtual port to the appropriate virtual network based on the classification of the first set of packets. Concurrently, a second set of packets associated with a second application may be received and classified, followed by forwarding those second set of packets through the network via the appropriate virtual port to the appropriate virtual network based on the classification of the second set of packets. This may occur for any number of applications running on any number of IHSs within the networked system.

Thus, an application aware network switching system and method have been described that provide many advantages over conventional network switching systems known in the art. For example, the application aware network switching system and method of the present disclosure may be implemented to classify user IHS's such as, for example, Bring Your Own Device (BYOD) IHSs in an enterprise environment, by assigning virtual ports to those devices that are associated with separated virtual networks that allocate particular network resources and policies for network access (e.g., restricted Internet access, restricted network applications, and restricted network services). Furthermore, the virtual ports discussed above may be assigned to users to classify those users and restrict application and network resource usage and allocation. In general, the system and method of the present disclosure provide for the simple provisioning and identification of network services and application aware virtual networks, thus reducing the time necessary to configure and manage those virtual networks, while allowing seamless classification of applications run by users of the system. The present disclosure is applicable across multiple networking layers and deployment environments (e.g., CBM and DCN networking solutions), thus providing for longevity and reusability of the technology.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking device, comprising:
   a memory storing associations between a plurality of network applications and a plurality of virtual ports, wherein each of the plurality of network applications is associated with a subset of the plurality of virtual ports; and
   a processor coupled to the memory, wherein the processor is configured to:
      receive a first packet from a first networked device;
      determine that the first packet was received from a first network application of the plurality of network applications that is provided on the first networked device;
      determine a first subset of the plurality of virtual ports that is associated with the first network application in the memory; and
      forward the first packet received from the first network application provided on the first networked device, and subsequent packets received from the first network application provided on the first networked device or at least one second networked device, using the first subset of the plurality of virtual ports.

2. The networking device of claim 1, wherein the processor is configured to:
retrieve application layer metadata from an application layer in the first packet received from the first networked device, and from an application layer in the subsequent packets received from the first networked device and the at least one second networked device; and
use the application layer metadata to determine that the first packet and the subsequent packets were received from the first network application that is provided on the first networked device and the at least one second networked device.

3. The networking device of claim 1, wherein each subset of the plurality of virtual ports provides access to a virtual network that is provided for the network application associated with that subset of the plurality of virtual ports.

4. The networking device of claim 1, wherein the memory further includes network information associated with each of the plurality of network applications.

5. The networking device of claim 4, wherein the network information includes quality of service information, priority information, bandwidth allocation information, policy information, and traffic shaping information.

6. The networking device of claim 1, wherein the processor is configured to:
receive a second packet from a third networked device;
determine that the second packet was received from a second network application of the plurality of network applications that is provided on the third networked device;
determine a second subset of the plurality of virtual ports that is associated with the second network application in the memory; and
forward the second packet received from the second network application provided on the third networked device, and subsequent packets received from the second network application provided on the third networked device or at least one fourth networked device, using the second subset of the plurality of virtual ports.

7. The networking device of claim 6, wherein the processor is configured to:
retrieve application layer metadata from an application layer in the second packet received from the third networked device, and from an application layer in the subsequent packets received from the third networked device and the at least one fourth networked device; and
use the application layer metadata to determine that the second packet and the subsequent packets were received from the second network application that is provided on the third networked device and the at least one fourth networked device.

8. A networked system, comprising:
a plurality of computing devices; and
a networking device coupling the plurality of computing device to a network, wherein the networking device includes a processor that is configured to:
receive a first packet from a first computing device of the plurality of computing devices;
determine that the first packet was received from a first network application that is provided on the first computing device;
determine at least one first virtual port that is associated with the first network application; and
forward the first packet received from the first network application provided on the first computing device, and subsequent packets received from the first network application provided on the first computing device or at least one second computing device of the plurality of computing devices, using the at least one first virtual port.

9. The networked system of claim 8, wherein the processor is configured to:
retrieve application layer metadata from an application layer in the first packet received from the first computing device, and from an application layer in the subsequent packets received from the first computing device and the at least one second computing device; and
use the application layer metadata to determine that the first packet and the subsequent packets were received from the first network application that is provided on the first computing device and the at least one second computing device.

10. The networked system of claim 8, wherein the at least one first virtual port is at least one of a subset of a plurality of virtual ports that provide access to a virtual network that is provided for the first network application.

11. The networked system of claim 10, wherein the virtual network is configured using network information that is associated with the first network application.

12. The networked system of claim 11, wherein the network information includes quality of service information, priority information, bandwidth allocation information, policy information, and traffic shaping information.

13. The networked system of claim 8, wherein the processor is configured to:
receive a second packet from a third computing device of the plurality of computing devices;
determine that the second packet was received from a second network application that is provided on the third computing device;
determine at least one second virtual port that is associated with the second network application; and
forward the second packet received from the second network application provided on the third computing device, and subsequent packets received from the second network application provided on the third computing device or at least one fourth computing device of the plurality of computing devices, using the at least one second virtual port.

14. The networked system of claim 13, wherein the processor is configured to:
retrieve application layer metadata from an application layer in the second packet received from the third computing device, and from an application layer in the subsequent packets received from the third computing device and the at least one fourth computing device; and
use the application layer metadata to determine that the second packet and the subsequent packets were received from the second network application that is provided on the third computing device and the at least one fourth computing device.

15. A method for forwarding packets, comprising:
associating each of a plurality of network applications with a subset of a plurality of virtual ports in a database;
receiving a first packet over a network from a first networked device;

determining that the first packet is associated with a first network application of the plurality of network applications that is provided on the first networked device;

determining a first subset of the plurality of virtual ports that is associated with the first network application in the database; and forwarding the first packet received from the first network application provided on the first networked device, and subsequent packets received from the first network application provided on the first networked device or at least one second networked device, using the first subset of the plurality of virtual ports.

16. The method of claim 15, further comprising:

retrieving application layer metadata from an application layer in the first packet received from the first networked device, and from an application layer in the subsequent packets received from the first networked device and the at least one second networked device; and using the application layer metadata to determine that the first packet and the subsequent packets were received from the first network application that is provided on the first networked device and the at least one second networked device.

17. The method of claim 15, wherein each subset of the plurality of virtual ports provides access to a virtual network that is provided for the network application associated with that subset of the plurality of virtual ports.

18. The method of claim 17, further comprising:

configuring the virtual network using network information that is associated with the first network application.

19. The method of claim 15, further comprising:

receiving a second packet over a network from a third networked device;

determining that the second packet is associated with a second network application of the plurality of network applications that is provided on the third networked device;

determining a second subset of the plurality of virtual ports that is associated with the second network application in the database; and forwarding the second packet received from the second network application provided on the third networked device, and subsequent packets received from the second network application provided on the third networked device or at least one fourth networked device, using the second subset of the plurality of virtual ports.

20. The method of claim 19, further comprising:

retrieving application layer metadata from an application layer in the second packet received from the third networked device, and from an application layer in the subsequent packets received from the third networked device and the at least one fourth networked device; and using the application layer metadata to determine that the second packet and the subsequent packets were received from the second network application that is provided on the third networked device and the at least one fourth networked device.

* * * * *